Nov. 18, 1947.  D. R. STAPLES ET AL  2,431,145
ELECTRIC MOTOR CONTROL SYSTEM FOR LOCOMOTIVES
Filed March 23, 1945
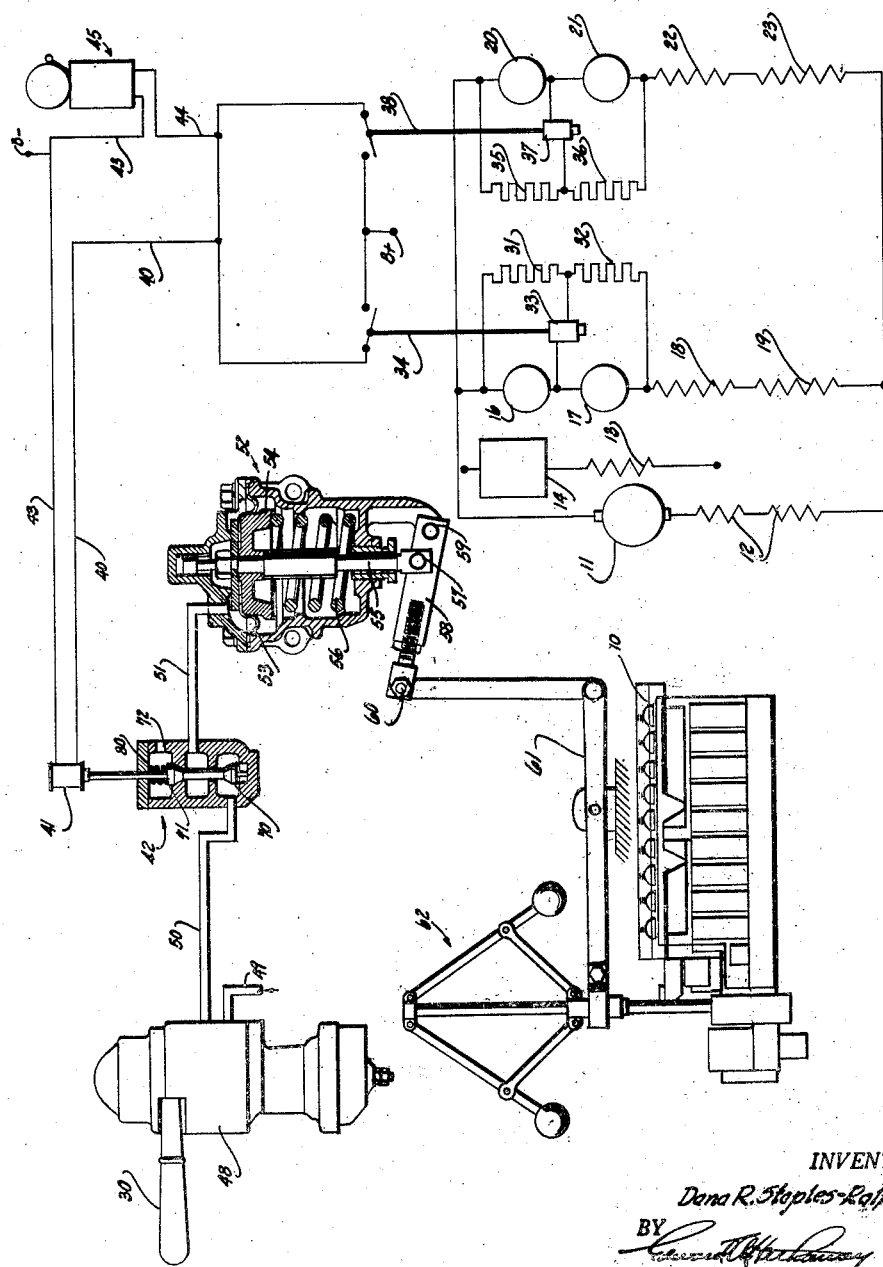
INVENTORS
Dana R. Staples - Ralph A. Miller
BY
ATTORNEY Patented Nov. 18, 1947

2,431,145

UNITED STATES PATENT OFFICE 2,431,145

ELECTRIC MOTOR CONTROL SYSTEM FOR LOCOMOTIVES

Dana R. Staples, Ridley Park, and Ralph A. Miller, Drexel Hill, Pa., assignors to The Baldwin Locomotive Works, a corporation of Pennsylvania Application March 23, 1945, Serial No. 584,448

5 Claims. (Cl. 290—17)

1

This invention relates to motor control systems of the type in which a generator supplies power to motors and has for an object the provision of improved means for automatically preventing slippage of locomotive wheels by reducing the power whenever the voltages across two of its driving motors differ from each other more than a predetermined value.

In locomotives employing an internal combustion engine, such as a Diesel engine, together with a generator driven thereby for the supply of current to traction motors, it is desirable to reduce the power supplied to the motors by the generator whenever the voltage variation between motors exceeds a predetermined value. Whenever there is wheel slippage, the motor speed rapidly increases and it has heretofore been recognized that a corresponding rise in voltage may be utilized to signal or indicate the existence of wheel slippage.

In carrying out the present invention in one form thereof, means are provided automatically to reduce the power supplied to the traction motors whenever the voltage variation between them increases above a predetermined value. After the reduction of the power and the consequent eventual reduction of the voltage difference below said predetermined value, the power supplied to the motors is gradually and progressively increased until it again corresponds with the setting of the power-applying control lever or throttle.

For further objects and advantages of the invention, reference should be had to the following description taken in conjunction with the accompanying drawing which is a wiring diagram of a typical embodiment of the invention, with certain of the mechanical elements diagrammatically outlined.

Referring to the drawing, the invention in one form has been illustrated as applied to a locomotive of the type in which a suitable prime mover, as a Diesel engine 10, is utilized to drive a generator 11 provided with commutator windings 12 and a separately excited field winding 13. The excitation of the field winding 13 is under the control of a separate field control means 14 which may or may not include an exciter, also driven by the Diesel engine 10. The generator 11 is connected to supply power to the motors 16 and 17, respectively provided with series field windings 18 and 19. The generator 11 also supplies power to the motors 20 and 21 connected in parallel with the motors 16 and 17

2 and in series with their respective field windings 22 and 23.

It is to be understood the motors 16, 17 and 20, 21 serve in conventional manner to drive the wheels of the locomotive or other vehicle. It is to be understood that the field windings 18, 19 and 22, 23 may be provided with reversing switches for reverse operation of the motors and that other conventional features of control, not shown, may be provided.

When starting a heavy train, especially on slippery rails, the wheels of the locomotive are likely to slip unless the power supplied by the Diesel engine 10 and the generator 11 is applied at a rate which maintains the traction below that which will cause slippage. Where the rails are slippery this is an important factor and frequently in starting the train under such conditions, the wheels will slip and the motors will speed up. If the operator is not immediately aware of wheel slippage, he may continue to move his throttle or controller handle 30 in a direction to increase the power supplied by the Diesel engine 10 further to increase the speed of the motors. Under these conditions it is possible that the motors may be seriously damaged, either by flashover, mechanical breakage of the banding wires or other holding means provided for the armature windings thereof.

Whenever wheel slippage occurs, the increased speed of operation of the motor greatly increases the voltage, the back electromotive force, which appears across the armature thereof. Accordingly, resistors 31 and 32 and the operating coil 33 of a relay 34 may be connected in a bridge circuit so that whenever the voltage across either of the armatures of motors 16 and 17 materially exceeds that of the other, the coil 33 will be energized to operate the relay 34. Similarly, resistors 35 and 36 are in conjunction with the operating coil 37 of a relay 38 connected to form a similar bridge circuit with the armatures of motors 20 and 21. It will, therefore, be seen that if there is slippage of the wheels driven by any one of the motors 16, 17 and 20, 21 the relay 34 or 38, or both, will be operated. In response to the energization of either of the relays 34 and 38 signalling and control circuits are completed. The control circuit may be traced from the positive source of supply indicated at B+ through one or both of the relay contacts, by way of conductor 40 to the operating coil 41 of a valve 42, and by conductor 43 to the other side of the supply line indicated at B—. Simultaneously, the signalling circuit is completed by way of conductor 44 to a signal device shown in the form of an electric bell or buzzer 45, and thence by conductor 43 to the other side of the supply line B—. The electrically operated valve 42, in response to operation of either or both of relays 34 and 38, serves to reduce the power supplied by the Diesel engine 10 to the generator 11.

During normal operation of the locomotive, the operator grasps the handle 30 and moves it from an "off" position towards a "full-load" position. Normally the control lever or throttle 30 is moved through a plurality of positions gradually to increase the power delivered to the generator 11 by the engine 10. The lever 30 may control an air or pneumatic regulating device of conventional design, as indicated at 48. Compressed air may be supplied thereto by way of inlet pipe 49 and at a predetermined pressure, determined by the position or setting of the control lever 30, may be applied by the pipe 50 to the magnetically controlled valve 42. As shown, this valve is in the "open" position for transmission of the air pressure directly to a pipe 51 which leads to an air or pneumatically operated control device 52. As shown, the air pressure is applied to a diaphragm 53 which is arranged to operate a member 54 and a plunger 55 downwardly against the bias of a compression spring 56. The lower end of the plunger 55 is pivoted as at 57 to a lever 58, arranged to rotate about a fixed pivot 59. Its opposite end is pivotally connected at 60 to a link 61 arranged to adjust the setting of a governor 62 provided on the Diesel engine 10. In brief, for every position of the control lever or throttle 30 there is a corresponding position for the lever 58 whereby the governor 62 may be set for different speeds of operation of the Diesel engine 10. Accordingly, the operator by simply moving the control lever 30 to any desired position may increase or decrease the power supplied to the traction motors 16, 17 and 20, 21. Thereafter, the governor 62 will function in the usual manner to maintain the output of the engine 10 at the value determined by the setting of the lever 61.

Whenever the applied power causes wheel slippage the operating coil 41 will be energized as described above. Thereupon the valve 42, through valve-element 70, closes the air-passage between the control pipes 50 and 51 and through the valve-element 71 connects the pipe 51 through the port 72 to atmosphere. The size of the port 72 is selected so that the pressure above the diaphragm 53 is gradually reduced. As the pressure on the diaphragm 53 is reduced, the spring 56 moves the levers 58 and 61 in directions to reduce the speed of the Diesel engine 10, thereby to decrease the power delivered to the generator 11. In turn, the power supplied by the generator 11 to the traction motors is correspondingly reduced. As soon as there is no further wheel slippage the excessive voltage disappears and the corresponding relay, 34 or 38, returns to its original position to open the circuit to the coil 41. A spring 80 then serves to return the valve 42 to its illustrated position, again to complete a connection between the pipes 50 and 51. In consequence, the diaphragm 53 is again pressed downwardly to move the lever 58 in a direction to increase the speed-setting of the governor 62. Accordingly the speed of the Diesel engine 10 will be gradually and progressively increased until it corresponds with the setting of the lever 58. This setting in turn will correspond to the original, or new, setting of the control lever or throttle 30.

The present control system is not only simple in its arrangement and operation but positive protection is provided against dangers incident to wheel slippage. As soon as slippage occurs, power is immediately reduced but only for the period during which slippage occurs. As soon as it terminates, power is again applied in a smooth and gradual manner.

The present system has the further advantage that excessive strains are minimized. There is no jerking and rough handling of the train due to slack running in and out, as between cars. There is avoided the sudden application of power which in itself will tend to produce wheel slippage. There is also avoided the sudden removal of power which would result in overspeeding of the Diesel engine, with possible resultant injury thereto.

While a preferred embodiment of the invention has been described, it will be understood that modifications thereof may be made without departing from the spirit and scope of the invention as set forth in the appended claims.

What is claimed is:

1. The combination with an engine, a generator driven thereby and motors supplied by said generator, of a throttle movable through a plurality of positions, control means operable through a plurality of positions under the control of said throttle for gradually and progressively increasing the speed of said engine to increase the power supplied by said generator to said motors, the amount of power supplied being determined by the position of said control means, and means responsive to the voltage difference across said motors for operating said control means automatically to reduce the speed of said engine and the power supplied to said motors whenever the voltage across said motors increases above a predetermined value and after said voltage decreases below said value for thereafter gradually and progressively increasing said speed and power until they again correspond with the setting of said throttle.

2. The combination with an engine, a generator driven thereby and motors supplied by said generator, of a throttle, control means operable under the control of said throttle through a plurality of positions between an "off" position and a "full-load" position for controlling the speed and amount of power supplied by said generator to said motors, the amount of power supplied being determined to a large degree by the position of said control means, and means operable independently of said throttle for gradually and progressively changing the position of said control means in response to a voltage difference across the armatures of said motors for automatically and continuously reducing the speed of said engine to reduce the power supplied by said generator to said motors as long as said voltage difference exceeds a predetermined value and for thereafter gradually and progressively increasing said speed and said power until they correspond with the setting of said throttle.

3. The combination with an engine, a generator driven thereby and motors supplied by said generator, of a throttle, control means operable through a plurality of positions for gradually and progressively increasing the speed of said engine to increase the power supplied by said generator to said motors, the amount of power supplied being determined by the position of said control means, and means operable independently of said throttle and responsive to loss of load by said motors for gradually and continuously reducing the speed of said engine and the power supplied to said motors until return of the load to said motors, said means being thereafter effective for automatically and gradually increasing said speed and power until they correspond with the setting of said throttle.

4. The combination with an engine, a generator driven thereby and motors supplied by said generator, of a governor having a control lever operable through a plurality of positions for controlling the speed of said engine, the amount of power supplied by said engine being determined by the setting of said control lever, pneumatic means for operating said lever to a predetermined position, a throttle regulating said pneumatic means to predetermine the speed-setting of said control lever, and means responsive to a voltage difference across said motors for automatically modifying the action of said pneumatic means gradually and progressively to reduce the speed-setting of said governor whenever said voltage difference increases above a predetermined value and after said voltage difference decreases below said value for gradually and progressively returning said control lever to its original speed-setting as determined by said throttle.

5. In a traction system having a plurality of wheel-driving motors supplied by a generator which in turn is driven by an engine, regulating means for controlling the output of said engine, and a throttle operable throughout a plurality of positions, the combination of means for protecting said motors against wheel slipage comprising pneumatic means operable in response to the setting of said throttle for adjusting said regulating means for an engine-output corresponding with the setting of said throttle, modifying means operable independently of said throttle for adjusting said regulating means so as to reduce the output of said engine, and means operable whenever there is excessive speed of rotation of any one of said motors for controlling the operation of said modifying means to reduce the output of said engine until disappearance of said excessive speed and for thereafter gradually and progressively increasing the output of said engine until it again corresponds with the setting of said throttle.

DANA R. STAPLES.
RALPH A. MILLER.

REFERENCES CITED

The following references are of record in the file of this patent:

UNITED STATES PATENTS

| Number | Name | Date |
|---|---|---|
| Re. 22,588 | Kew | Jan. 9, 1945 |
| 715,019 | Case | Dec. 2, 1903 |
| 2,050,068 | Schaer | Aug. 4, 1936 |
| 2,266,326 | Lillquist | Dec. 16, 1941 |
| 2,280,378 | Cowin | Apr. 21, 1942 |
| 2,303,951 | Oswald | Dec. 1, 1942 |
| 2,304,937 | Lillquist | Dec. 15, 1942 |
| 2,337,717 | Hines | Dec. 8, 1943 |
| 2,371,832 | Lillquist | Mar. 20, 1945 |